US008790768B2

(12) United States Patent
Pershing et al.

(10) Patent No.: US 8,790,768 B2
(45) Date of Patent: Jul. 29, 2014

(54) COATING COMPOSITIONS AND RELATED PRODUCTS AND METHODS

(75) Inventors: Lan W. Pershing, Waxhaw, NC (US); Barry A. Goldslager, Hudson, OH (US)

(73) Assignee: OMNOVA Solutions Inc., Fairlawn, OH (US)

(*) Notice: Subject to any disclaimer, the term of this patent is extended or adjusted under 35 U.S.C. 154(b) by 851 days.

(21) Appl. No.: 12/317,772

(22) Filed: Dec. 29, 2008

(65) Prior Publication Data

US 2009/0208710 A1 Aug. 20, 2009

Related U.S. Application Data

(63) Continuation of application No. PCT/US2007/014767, filed on Jun. 26, 2007.

(60) Provisional application No. 60/817,854, filed on Jun. 30, 2006, provisional application No. 60/834,244, filed on Jul. 28, 2006.

(51) Int. Cl.
*B32B 3/10* (2006.01)

(52) U.S. Cl.
USPC ........ 428/147; 428/141; 428/143; 428/195.1; 428/201; 428/206; 523/220

(58) Field of Classification Search
USPC .............. 428/195.1, 141, 143, 147, 201, 206; 523/220
See application file for complete search history.

(56) References Cited

U.S. PATENT DOCUMENTS

| | | | |
|---|---|---|---|
| 4,111,713 A | 9/1978 | Beck | |
| 5,056,918 A | 10/1991 | Bott et al. | |
| 5,916,666 A | 6/1999 | Huber et al. | |
| 6,040,044 A | 3/2000 | Takahashi et al. | |
| 6,110,316 A | 8/2000 | Kobayashi et al. | |
| 6,156,468 A | 12/2000 | Wehelie et al. | |
| 6,270,562 B1 | 8/2001 | Jia | |
| 6,426,034 B1* | 7/2002 | McComas et al. | 264/494 |
| 6,780,804 B2 | 8/2004 | Webber et al. | |
| 6,797,102 B2 | 9/2004 | Garcia et al. | |
| 6,803,110 B2 | 10/2004 | Drees et al. | |
| 6,852,399 B2 | 2/2005 | Takahashi et al. | |
| 7,029,759 B2 | 4/2006 | Sobieski et al. | |
| 7,036,591 B2 | 5/2006 | Cannan et al. | |
| 7,057,712 B2 | 6/2006 | Beck et al. | |
| 2002/0137872 A1* | 9/2002 | Schneider et al. | 528/44 |
| 2004/0170806 A1 | 9/2004 | Hittle et al. | |
| 2005/0025967 A1 | 2/2005 | Lawton et al. | |
| 2005/0106357 A1 | 5/2005 | Mayade | |
| 2006/0075930 A1 | 4/2006 | Wang et al. | |

FOREIGN PATENT DOCUMENTS

JP    1998-180966    7/1998

OTHER PUBLICATIONS

The Cary Company, 3M(TM) Zeeospheres(TM) Ceramic Microspheres W-610, Product Information, 2 pages, 2004, internet.
3M, 3M Material Safety Data Sheet Zeeospheres (TM) Ceramic Microspheres, 7 pages, Mar. 29, 2004, internet.
8 ways to help you reduce costs while enhancing paint and powder coating performance, 3M Ceramic Microspheres, Paints and Coatings Applications Profile, 2 pages, internet, 2004.
3M, 3M Zeeospheres(TM) Ceramic Microspheres Gray Grades, Product Information, 2 pages, 2003, internet.
3M, 3M Zeeospheres(TM) Ceramic Microspheres White Grades, Product Information, 2 pages, 2003, internet.
CSIRO Pub., Drevin, G.R. et al.,"Granulometric Determination of Sedimentary Rock Particle Roundness," pp. 315-325, Apr. 2002, Math. Mor., Proc. of the VIth Intl Symp. ISMM2002.

* cited by examiner

*Primary Examiner* — Mark Ruthkosky
*Assistant Examiner* — Christopher Polley
(74) *Attorney, Agent, or Firm* — Kagan Binder, PLLC; David G. Burleson

(57) ABSTRACT

A coating composition including an uncured binder component and a particle component. The particle component can include a plurality of first particles and/or a plurality of second particles. The first particles are non-spherical and have an average particle size in the range of from about 0.5 to about 20 μm and have a Mohs hardness in the range from about 4 to about 7. The first particles are made of material comprising inorganic, amorphous, glass material. The second particles are at least substantially spherical and have an average particle size in the range of from about 0.5 to about 70 μm. The second particles are made of material comprising organic material.

12 Claims, 1 Drawing Sheet

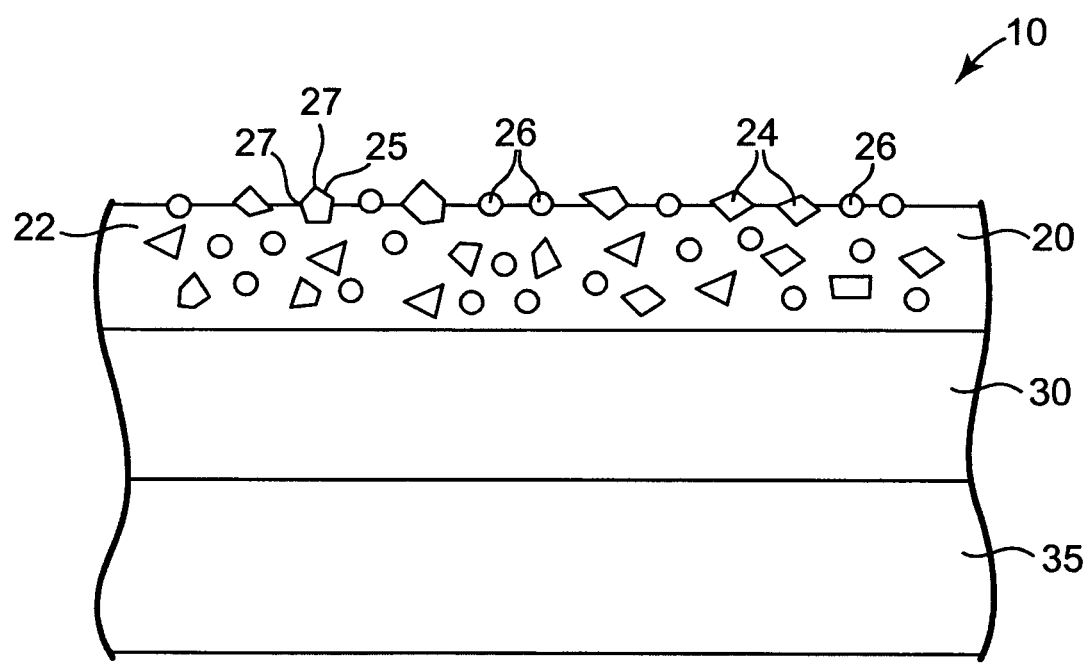

COATING COMPOSITIONS AND RELATED PRODUCTS AND METHODS

This is a continuation of International Application Number PCT/US2007/014767, having an International Filing Date of 26 Jun. 2007, which claims priority to and the benefit of U.S. provisional patent application Nos. 60/817,854 and 60/834,244, filed on 30 Jun. 2006 and 28 Jul. 2006, respectively, both in the name of Pershing and both entitled COATING COMPOSITIONS AND RELATED PRODUCTS AND METHODS, is claimed. The entireties of said three applications are incorporated herein by reference.

BACKGROUND INFORMATION

Decorative laminates are known. A decorative laminate typically includes a substrate and a coating layer on the substrate (often called a top-coat); see, e.g., U.S. Pat. No. 6,040,044 (Takahashi et al.), U.S. Pat. No. 6,797,102 (Garcia et al.), U.S. Pat. No. 6,852,399 (Takahashi et al.), and U.S. Pat. No. 7,029,759 (Sobieski et al.).

In general, a top-coat is known to provide a certain amount of abrasion resistance to the decorative laminate to prevent the decorative laminate from undue marring and scratching. However, many decorative laminates having a protective top-coat still suffer from undue marring and scratching during one or more of manufacturing, packaging, storage, transportation, installation, and service life.

In addition, it is sometimes desirable to provide certain visual and/or tactile characteristics to a decorative laminate so as to help penetrate certain markets by providing a similar but, e.g., less expensive product via the use of a decorative laminate.

Accordingly, there is a continuing need for new and improved decorative laminates that have one or more desired properties such as abrasion resistance, tactile characteristic, combinations of these, and the like.

SUMMARY OF THE INVENTION

The inclusion of one or more specific particle ingredient(s) in a coating composition can provide a decorative laminate topcoat with enhanced abrasion resistance. Advantageously, such protective topcoats can reduce and/or eliminate undue marring and scratching of the decorative laminate during one or more of manufacturing, packaging, storage, transportation, installation, and service life. Accordingly, such enhanced abrasion resistance can result in improved yields and/or customer satisfaction.

Including one or more specific particle ingredient(s) in a coating composition can provide (or enhance) a decorative laminate topcoat with a particular tactile characteristic. An example of a particularly preferred tactile characteristic is that of wood such as scuffed or roughly sanded wood. Advantageously, such topcoats having a particular tactile characteristic can allow one or more particular markets to be penetrated. For example, certain markets can be penetrated by providing a similar but less expensive product via the use of a decorative laminate. A particularly preferred market is that of cabinetry for use in motor vehicles such as buses, airplanes, RVs, boats, ships, and the like.

According to one aspect of the present invention, a coating composition includes an uncured binder component and a particle component. The particle component includes a plurality of first particles that are non-spherical and have an average particle size in the range of from about 0.5 to about 20 μm. The first particles have a Mohs hardness in the range from about 4 to about 7 and are made of material including inorganic, amorphous, glass material.

In preferred embodiments, first particles are made from material that includes natural glass.

Preferred first particles are made from material that includes an aluminosilicate ingredient (e.g., alkali aluminosilicate ingredient).

In a preferred embodiment, the composition further includes a plurality of second particles that are at least substantially spherical and have an average particle size in the range of from about 0.5 to about 70 μm. Second particles are made of material that includes organic material.

According to another aspect of the present invention, a coating composition includes an uncured binder component and a particle component. The particle component includes a plurality of particles that are at least substantially spherical and have an average particle size in the range of from about 0.5 to about 70 μm. The particles are made of material that includes organic material. Preferred particles are made of material that includes a cross-linked polymethyl methacrylate ingredient.

According to another aspect of the present invention, a method of making a coating composition includes the steps of 1) providing an uncured binder component and a particle component and 2) combining the uncured binder component and particle component in a manner so as to provide a coating composition. The particle component includes a plurality of particles that are non-spherical and have an average particle size in the range of from about 0.5 to about 20 μm. The particles have a Mohs hardness in the range of from about 4 to about 7 and are made of material that includes inorganic, amorphous, glass material.

In preferred embodiments, coating compositions according to the present invention are used to provide top-coats for decorative laminates (the topcoats being at least substantially cured).

BRIEF DESCRIPTION OF THE DRAWINGS

FIG. 1 shows a schematic cross-section of a portion of a decorative laminate that includes a coating according to the present invention.

DETAILED DESCRIPTION

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

One embodiment of a decorative laminate that includes a coating according to the present invention is schematically illustrated in FIG. 1. As shown, decorative laminate 10 includes a coating 20, substrate 35, and optional ink pattern 30.

Coating 20 includes a binder 22 and a particle component that for purposes of illustration includes both first plurality of particles 24 (also referred to hereinafter as "first particles 24") and second plurality of particles 26 (also referred to hereinafter as "second particles 26").

The thickness of coating 20 can vary over a wide range. In general, coating 20 has a thickness that sufficiently retains the particle component while at the same time maintaining a sufficient amount of flexibility with respect to the decorative laminate. Representative embodiments of a decorative laminate coating according to the present invention can have a thickness in the range of from ~0.6 to ~25 μm (about 0.025 to about 1 mil). Preferred decorative laminate coatings can have thicknesses in the range of from ~1.25 to ~12.5 μm (about 0.05 to about 0.5 mil).

In general, the ratio of average particle size to coating 20 thickness can be in the range of from about 3:1 to about 1:500. When targeting an abrasion resistant coating 20, the ratio of the average particle size of first particles 24 to coating 20 thickness is in the range of from about 1:0.5 to about 1:10, preferably from about 1:1 to about 1:4. When targeting a tactile characteristic of coating 20 that is indicative of wood, the ratio of the average particle size of second particles 26 to coating 20 thickness is in the range of from about 5:1 to about 1:1, preferably from about 4:1 to about 1:1.

Binder 22 can help provide decorative laminate 10 with a certain amount of abrasion resistance and can help adhere first particles 24 and second particles 26 to coating 20, while at the same time helping provide coating 20 with a certain amount of flexibility such that coating 20 does not crack or otherwise degrade to an undue degree during manufacturing, packaging, storage, transportation, installation, service-life, combinations of these, and the like.

Binder 22 includes at least one resin ingredient. Resin ingredients for use in binder 22 can be thermoplastic, thermosetting, and combinations thereof. One or more resin ingredients for use in binder 22 can be chemically cured, thermally cured, physically cured, radiation cured (e.g., ultraviolet (UV), electron beam (EB)), ionically cured, crosslinked, combinations of these, and the like. Such methods of curing and crosslinking are well known. For example, see U.S. Pat. No. 6,110,316 (Kobayashi et al.) and U.S. Pat. No. 6,797,102 (Garcia et al.), the entireties of each reference of which are incorporated herein by reference.

Accordingly, binder 22 can further include appropriate curing and/or crosslinking enhancement agents such as one or more of catalyst(s), photoinitiator(s), crosslinking agent(s), combinations of these, and the like.

The amount of binder 22 in coating 20 can vary over a wide range. In representative embodiments, binder 22 can be present in an amount in the range from about 45 to about 99.99 percent based on the total weight of coating 20. In other representative embodiments, binder 22 can be present in an amount in the range from about 45 to about 95 percent based on the total weight of coating 20.

First particles 24 are non-spherical, inorganic, amorphous, glass particles having a Mohs hardness in the range from about 4 to about 7 and an average particle size in the range of from about 0.5 to about 20 μm. As used herein, the term "non-spherical" with respect to particle shape means the particle is not substantially rounded to form a sphere or oval shaped particle. For example, non-spherical particles include irregular shaped particles and regular shaped particles (e.g., cube shaped particles, prism shaped particles, pyramidal shaped particles, cone shaped particles, combinations of these, and the like). Preferred non-spherical particles include irregular shaped particles. For example, as schematically shown in FIG. 1, first particles 24 are non-spherical and irregular in shape. Non-spherical, irregular first particles 24 include many features 25 and 27 thereby causing particles 24 to be non-spherical.

The shape of a particle can be quantified so as to help determine whether it is non-spherical according to the present invention. One such way of quantifying the shape of particles 24 is to determine the average Krumbein shape factor for roundness and sphericity. The Krumbein shape factor is a well-known method of characterizing particle shape. See, e.g., U.S. Pat. No. 6,780,804 (Webber et al.) and U.S. Pat. No. 7,036,591 (Cannan et al.), the entireties of each reference of which are incorporated herein by reference. In general, the Krumbein roundness and sphericity are determined by comparing a particle to standard silhouette profiles on a Krumbein roundness and sphericity chart. As used herein, a particle is considered non-spherical if the particle has a Krumbein roundness of 0.8 or less and a Krumbein sphericity of 0.9 or less. In preferred embodiments, a non-spherical particle according to the present invention has a Krumbein roundness of 0.7 or less and a Krumbein sphericity of 0.9 or less. In even more preferred embodiments, a non-spherical particle according to the present invention has a Krumbein roundness of 0.7 or less and a Krumbein sphericity of 0.7 or less.

As used herein, the term "inorganic" means particles 24 are made from ingredients that do not include hydrocarbons or derivatives of hydrocarbons. As used herein, "amorphous" means particles 24 are non-crystalline and do not have a lattice structure that is characteristic of the solid state. Amorphous materials can occur naturally or can be synthesized. Amorphous materials typically result from rapidly cooling a material and/or including additives that hinder the atoms or molecules of a material from forming a lattice structure that is characteristic of the solid state.

As used herein, the term "glass" means a particle made out of inorganic material that is predominately amorphous (non-crystalline) as determined, for example, by X-ray diffraction analysis of the particle. Glasses are characterized by a random structure with no long-range (crystalline) order. In preferred embodiments, particles 24 are natural glass particles. As used herein, the term "natural glass" refers glass that is formed by a volcanic activity.

First particles 24 also have a Mohs hardness in the range from about 4 to about 7. In preferred embodiments, first particles 24 have a Mohs hardness in the range from about 4 to about 6. "Mohs" hardness and the determination of the Mohs hardness of a material are well known. In brief, a material of unknown Mohs hardness is subjected to a "scratch" test to see if it can scratch materials of known Mohs hardness. The higher the Mohs hardness value the harder the material. The following materials have known Mohs hardness values (indicated in parentheses) and, at least some of which, can be used to determine the Mohs hardness of a particular material: Talc (1), Gypsum (2), Calcite (3), Fluorite (4), Apatite (5), Orthoclase (6), Quartz (7), Topaz (8), Corundum (9), and Diamond (10).

First particles 24 also have an average particle size in the range of from ~0.5 to ~20 μm. In preferred embodiments, first particles 24 have an average particle size in the range of from ~0.5 to ~15 μm, even more preferably from ~1 to ~12 μm. These average particle size values are given in spherical diameter equivalents. A spherical diameter equivalent determines what the diameter would be of a spherical particle having the same volume as a non-spherical particle. Spherical diameter equivalent values can be obtained using well known laser methods; see, e.g., U.S. Pat. No. 5,056,918 (Bott et al.).

Exemplary first particles 24 can be commercially obtained from VitroTech Corporation, Santa Ana, Calif., under the trade designations VITROCOTE™, VITROCOTE™ F, VITROCOTE™ FC, VITROCOTE™ XFC, and combinations thereof. Preferred first particles 24 include VITROCOTE™ FC particles, which are non-spherical, amorphous, natural glass particles having a Mohs hardness in the range from about 5 to about 5.5, an average particle size less than 10 μm, and made from a mixture of naturally occurring silicates and aluminosilicates of sodium, potassium, calcium, magnesium, and iron.

First particles 24 provide coating 20, and therefore decorative laminate 10, with enhanced abrasion resistance. For example, first particles 24 provide coating 20 with an enhanced abrasion resistance that helps prevent the decorative laminate 10 from undue marring during manufacturing, packaging, storage, transportation, installation, combinations of these, and the like. As an example, decorative laminates are often cut into sheets (e.g., 4 foot×8 foot, 5 foot×10 foot sheets, and the like) and stacked on top of each other before being further processed (e.g., being further dimensioned to specific applications such as door coverings, cabinet coverings, and the like). In such contexts, first particles 24 provide coating 20 with an enhanced abrasion resistance that helps prevent the decorative laminate from undue marring as the coating 20 surface contacts the adjacent surface of a similar decorative laminate in a stack of decorative laminate sheets.

A desired abrasion resistance provided by coating 20 can be qualitatively evaluated by, for example, subjecting coating 20 to a Steel Wool Rub Test. The Steel Wool Rub Test involves rubbing fine grade steel wool (e.g., grade 000 steel wool) back and forth across the surface of a decorative laminate coating using moderate hand pressure. One back and forth motion is referred to as a "double-rub." The number of double-rubs is counted until the surface is visually observed to scratch and/or graphic inks are removed. A coating according to the present invention (e.g., coating 20) can withstand up to about 200 or more double-rubs before scratching.

First particles 24 can be incorporated in an amount with other coating components (e.g., binder 22 and second particles 26) so as to provide coating 20 with a desired degree of abrasion resistance while maintaining a desired degree of coating flexibility so that the coating does not crack to an undue degree, if at all, during manufacturing, packaging, storage, transportation, installation, service-life, combinations of these, and the like. The amount of first particles 24 to incorporate into coating 20 can also depend on one or more factors such as binder 22 chemistry, coating 20 thickness, combinations of these, and the like. In one embodiment, first particles 24 can be present in an amount in the range from 0.01 to 50% based on the total weight of coating 20. In another embodiment, first particles 24 can be present in an amount in the range from 0.5 to 30% based on the total weight of coating 20. In another embodiment, first particles 24 can be present in an amount in the range from 0.5 to 20% based on the total weight of coating 20. In another embodiment, first particles 24 can be present in an amount in the range from 0.5 to 15% based on the total weight of coating 20. In another embodiment, first particles 24 can be present in an amount in the range from 0.5 to 10% based on the total weight of coating 20. In still another embodiment, first particles 24 can be present in an amount in the range from 0.5 to 8% based on the total weight of coating 20.

As shown in FIG. 1, first particles 24 are generally distributed uniformly in coating 20 with at least some of particles 24 protruding from the top surface of coating 20. Factors may influence how particles 24 are distributed in coating 20 and how many particles 24 protrude from the top surface of coating 20 such as the thickness of coating 20, the density of particles 24, the size of particle 24, combinations of these, and the like.

Optionally, coating 20 can further include second particles 26. Second particles 26 are at least substantially spherical, organic particles having an average particle size in the range of from about 0.5 micron to about 70 microns.

As used herein, the phrase "at least substantially spherical" with respect to particle shape means the particle is substantially rounded to form a spherical or oval-shaped (or ellipsoid including an oblate ellipsoid) particle. For example, as shown in FIG. 1, second particles 26 are at least substantially spherical in shape. In certain embodiments, particles 26 are spherical. The shape of second particles 26 can be quantified in a similar manner as discussed above with respect to first particles 24 using the average Krumbein shape factor for roundness and sphericity. As used herein, an at least substantially spherical particle according to the present invention has a Krumbein roundness of 0.9 or greater and a Krumbein sphericity of 0.5 or greater. In preferred embodiments, an at least substantially spherical particle according to the present invention has a Krumbein roundness of 0.9 or greater and a Krumbein sphericity of 0.9 or greater.

Particles 26 are also organic particles. As used herein, the term "organic" means particles 26 are made from ingredients that are compounds of carbon except such binary compounds as carbon oxide, carbon disulfide, carbide, and the like; such ternary compounds as metallic cyanide, phosgene, metallic carbonyls, carbonyl sulfide, and the like; and metallic carbonates such as sodium carbonate and calcium carbonate. In preferred embodiments, particles 26 are made of material that includes an acrylic resin. As used herein, the term "acrylic resin" refers to thermoplastic polymers or copolymers of acrylic acid, methacrylic acid, esters of such acids, or acrylonitrile. For example, particles 26 can be made of one or more organic, cross-linked ingredients such as polymethyl methacrylate (PMMA), polyacrylic ester (PAE), polybutyl (meth)acrylate (PBMA), and combinations thereof. In preferred embodiments, particles 26 are made of material based on (meth)acrylate, with methacrylate being preferred. Particles 26 can also be made of material that includes polystyrene.

Second particles 26 also have an average particle size in the range of from about 0.5 micron to about 70 microns. In one embodiment, second particles 26 can have an average particle size in the range of from about 0.5 micron to about 50 microns, even from about 0.5 micron to about 40 microns, or even from about 0.5 micron to about 30 microns. Average particle size of particles 26 can be determined by any known method such as light scattering techniques (see, e.g., U.S. Pat. No. 7,057,712 (Beck et al.)).

Exemplary second particles 26 can be commercially obtained from Sekisui Plastics Co., LTD., Osaka, Japan, under the trade designations MBX, MB20X, MB30X, and combinations thereof. MBX, MB20X, and MB30X are spherical, organic particles of cross-linked PMMA having a specific gravity of 1.20, a refractive index of 1.49, and a heat resistance in the range from 250° to 270° C. Preferred second particles 26 include MBX-20, MBX-30, and combinations thereof. MBX-20 are spherical, organic particles of crosslinked PMMA having a standard degree of cross-linking and a mean particle size of 20 μm. MBX-30 are spherical, organic particles of crosslinked PMMA having a standard degree of cross-linking and a mean particle size of 30 μm.

Second particles 26 can help provide (or enhance) a tactile characteristic to coating 20. An example of a desirable tactile characteristic is that of wood such as scuffed or roughly sanded wood. A desired wood tactile characteristic imparted by a decorative laminate 10 can be quantified by measuring the smoothness of the surface of coating 20. Determining the smoothness of a surface of coating 20 can be done using any known method such determining the Sheffield Smoothness, Bendtsen Smoothness, Bekk Smoothness, combinations of these, and the like.

For example, in general the Sheffield Smoothness of a surface is determined by measuring the amount of air that escapes when a Sheffield tester is pressed flat against a surface and air is forced (blown) against the surface. The less air that escapes, the smoother the surface is. Accordingly, the lower the Sheffield Smoothness value is for a surface, the smoother the surface is. Sheffield testers are readily available and can be commercially obtained from, e.g., Testing Machines, Inc. (Ronkonkoma, N.Y.).

Coating 20 can have a desirable tactile characteristic imparted by second particles 26 when coating 20 has a Sheffield Smoothness in the range of from about 100 cubic centimeters per minute (cc/min) to about 350 cc/min, preferably from about 250 cc/min to about 300 cc/min.

Second particles 26 can be incorporated in an amount with other coating components (e.g., binder 22 and first particles 24) so as to provide coating 20 with a tactile characteristic indicative of wood while maintaining a desired degree of coating 20 flexibility so that coating 20 does not crack to an undue degree, if at all, during manufacturing, packaging, storage, transportation, installation, service, combinations of these, and the like. The amount of second particles 26 to incorporate into coating 20 can also depend on one or more factors such as binder 22 chemistry, coating 20 thickness, combinations of these, and the like. In one embodiment, second particles 26 can be present in an amount in the range from 0.01 to 50% based on the total weight of coating 20. In another embodiment, second particles 26 can be present in an amount in the range from 0.01 to 30% based on the total weight of coating 20. In another embodiment, second particles 26 can be present in an amount in the range from 0.01 to 20% based on the total weight of coating 20. In another embodiment, second particles 26 can be present in an amount in the range from 0.01 to 15% based on the total weight of coating 20.

As shown in FIG. 1, second particles 26 are generally distributed uniformly in coating 20 with at least some of particles 26 protruding from the top surface of coating 20. Factors may influence how particles 26 are distributed in coating 20 and how many particles 26 protrude from the top surface of coating 20 such as the thickness of coating 20, the density of particles 26, the size of particles 26, combinations of these, and the like.

Optionally, coating 20 can further include one or more additional ingredients that are well known for use in coatings such as decorative laminate overcoats, ink patterns, combinations of these, and the like. Such additional ingredients include one or more of plasticizer(s), flow promoter(s), surfactant(s), release agent(s), flatting agent(s), coloring agent(s), wetting agent(s), wax ingredient(s), silicone based polymer ingredient(s) (e.g., polydimethylsiloxane (PDMS)), matting agent(s), solvent(s), combinations of these, and the like.

Substrate 35 helps function as a support upon which coating 20 and ink pattern 30 are applied. Substrate 35 can be any substrate that is suitable for use in a decorative laminate. Such substrates are well known and include, for example, paper substrate, fabric substrate (e.g., woven, knit, non-woven, combinations of these, and the like), plastic substrate, wood substrate, metallic substrate, combinations of these, and the like. Such substrates are further described in U.S. Pat. No. 6,040,044 (Takahashi et al.), U.S. Pat. No. 6,797,102 (Garcia et al.), U.S. Pat. No. 7,029,759 (Sobieski et al.), the entireties of each reference of which are incorporated herein by reference. In a preferred embodiment, substrate 35 includes a wood substrate such as fiberboard (e.g., medium density fiberboard (MDF) or high density fiberboard (HDF)), pressboard, particleboard (e.g., cement bonded particleboard), strawboard, waferboard, riceboard, agriboard (e.g., wheatboard), oriented strand board (OSB), chipboard, plywood, combinations of these, and the like.

Optional ink pattern 30 can be any ink pattern that is suitable for use in a decorative laminate. For example, ink pattern 30 could be a solid color, printed text, graphical design(s), combinations of these, and the like. Ink pattern 30 could be a composite of multiple layers as in process printing or as in spot printing. In a preferred embodiment, ink pattern 30 can include a wood grain pattern to simulate the appearance of wood.

Decorative laminate 10 can be made using equipment (e.g., coating equipment) well known for making decorative laminates.

For example, ink pattern 30 can be applied to substrate 35 by well known methods such as rotogravure printing, flexographic printing, offset printing, combinations of these, and the like; see, e.g., U.S. Pat. No. 5,916,666 (Huber et al.).

Coating 20 can be applied to ink pattern 30 and/or substrate 35 by well known methods such as engraved gravure printing, reverse gravure printing, gravure offset printing, slot-die coating/printing, meyer bar printing, rotogravure printing, flexographic printing, offset printing, combinations of these, and the like; see, e.g., U.S. Pat. No. 5,916,666 (Huber et al.).

A decorative laminate according to the present invention (e.g., decorative laminate 10) could be used in connection with furniture, wall paneling, office partitions, case goods, cabinetry (e.g., kitchen and bath cabinetry), doors, electronic device surfaces, molding profiles, combinations of these, and the like. In a particularly preferred embodiment, a decorative laminate according to the present invention can be used in connection with cabinetry located in motor vehicles such as buses, airplanes, RVs, boats, ships, and the like.

EXAMPLES

One or more of the coating ingredients listed below were used in the following examples:

HU-4 Gloss and HU-7 Matte acrylic resin (Hi Tech);

CB 75 TDI pre-polymer (Bayer);

NLHGS00090241 acrylic melamine and PGA00110G/C alkyd melamine resins (Sun Chemical);

CN104 epoxy diacrylate (Sartomer);

HU-2 Wax Additive, a blend of PE and PTFE at 20% solids (Hi Tech);

HU-2 Slip Additive, PDMS at 20% solids (Hi Tech);

DC 56 Anti-Microfoam (Dow Corning);

Vitrocote™ 1200 aluminosilicate particles (Vitro Tech Co.);

MBX-30 PMMA resin beads (Sekisui);

Cat 51-53 PTSA-isopropanol, 50% active (Sun Chemical);

Slip Ayd™ SL 177 PE wax additive (Daniels);

DC 1248 hydroxyl-functional PDMS (Dow Corning);

Syloid 807 precipitated silica matting particles (Grace);

SR-238 1,6-hexanediol diacrylate (Sartomer);

DVE-3 triethylene glycol divinyl ether (ISP);

Rad 2500 acrylated PDMS (Tego Chemie);

Darocur™ 1173 photoinitiator (Ciba-Geigy); and dimethylethanolamine (Dow Chemical).

The viscosities of the various compositions were adjusted to 21 seconds (#2 Zahn) using a blend of alkyl acetates.

Example 1

The coating ingredients listed in Table 1 were weighed, added in the order listed, and mixed.

TABLE 1

| Ingredient | Parts by weight | Wt. percent based on total wt. |
|---|---|---|
| HU-4 Gloss | 100 | 65.6 |
| CB 75 | 35 | 23 |
| HU-2 Wax Additive | 5 | 3.3 |
| HU-2 Slip Additive | 5 | 3.3 |
| DC 56 | 1 | 0.7 |
| Vitrocote 1200 | 3.5 | 2.3 |
| MBX-30 | 3 | 2.0 |

After mixing, the coating composition was applied to a paper substrate via engraved gravure printing. (Typical pot life of this type of composition is on the order of 6 hours, although viscosity can increase under some processing conditions.) The coating was dried with forced air and infrared thermal ovens at ~90°-95° C. for less than 30 seconds before being stored in a curing room at ~71° C. (160° F.) for ~72 hours.

Example 2

The coating ingredients listed in Table 2 were weighed, added in the order listed, and mixed.

TABLE 2

| Ingredient | Parts by weight | Wt. percent based on total wt. |
|---|---|---|
| HU-7 Matte | 80 | 75.1 |
| CB 75 | 20 | 18.8 |
| HU-2 Wax Additive | 2 | 1.9 |
| HU-2 Slip Additive | 2 | 1.9 |
| DC 56 | 0.5 | 0.5 |
| Vitrocote 1200 | 2 | 1.9 |

After mixing, the coating composition was applied to a paper substrate via engraved gravure printing. (Typical pot life of this type of composition is on the order of 6 hours, although viscosity can increase under some processing conditions.) The coating was dried and cured similarly to that from Example 1.

Example 3

The coating ingredients listed in Table 3 were weighed, added in the order listed, and mixed.

TABLE 3

| Ingredient | Parts by weight | Wt. percent based on total wt. |
|---|---|---|
| NLHGS0090241 | 81 | 81.0 |
| Cat 51-53 | 7 | 7.0 |
| Slip Ayd SL 177 | 2 | 2.0 |
| DC 1248 | 1 | 1.0 |
| Syloid 807 | 5 | 5.0 |
| Vitrocote 1200 | 2 | 2.0 |
| MBX-30 | 2 | 2.0 |

After mixing, the coating composition was applied to a paper substrate via engraved gravure printing. The coating was cured with forced air and infrared thermal ovens at about ~175° C. (350° F.) for less than 30 seconds.

Example 4

The coating ingredients listed in Table 4 were weighed, added in the order listed, and mixed.

TABLE 4

| Ingredient | Parts by weight | Wt. percent based on total wt. |
|---|---|---|
| PGA00110G/C | 81 | 81.0 |
| Cat 51-53 | 7 | 7.0 |
| Slip Ayd SL 177 | 2 | 2.0 |
| DC 1248 | 1 | 1.0 |
| Syloid 807 | 5 | 5.0 |
| Vitrocote 1200 | 2 | 2.0 |
| MBX-30 | 2 | 2.0 |

The coating composition was applied and cured similarly to that of Example 3.

Example 5

The coating ingredients listed in Table 5 were weighed, added in the order listed, and mixed.

TABLE 5

| Ingredient | Parts by weight | Wt. percent based on total wt. |
|---|---|---|
| CN 104 | 40 | 37.4 |
| SR-238 | 30 | 28.0 |
| DVE-3 | 10 | 9.3 |
| Rad 2500 | 5 | 4.7 |
| Darocur 1173 | 7 | 6.5 |
| DMEA | 5 | 4.7 |
| Vitrocote 1200 | 4 | 3.7 |
| MBX-30 | 6 | 5.6 |

After mixing, the coating compositions was applied to a paper substrate via reverse gravure printing. The coating was cured by exposure to TV for several seconds.

The invention claimed is:

1. A decorative laminate comprising:
   a) a substrate having a major surface; and
   b) an ink pattern adjacent said major surface; and
   c) a coating composition located over the ink pattern, wherein the coating composition comprises:
      i) a substantially cured binder component having a first surface adjacent said major surface of the substrate and a second surface that is opposite the first surface; and
      ii) a particle component comprising:
      a plurality of first particles, wherein the first particles are non-spherical and have an average particle size in the range of from 1 to about 12 μm and have a Mohs hardness of from 4 to 7, wherein the first particles are present in an amount in the range of from 0.5 to 8 percent based on the total weight of the coating composition and wherein the first particles are made of material comprising inorganic, amorphous, glass material, wherein said material comprises an aluminosilicate ingredient; and
      a plurality of second particles, wherein the second particles are at least substantially spherical and have an average particle size of 20 or 30 μm, wherein the second particles are present in an amount in the range of from 0.01 to 15 percent based on the total weight of the coating composition and wherein the second particles are made of material comprising organic material, wherein the cured binder has a thickness in the range of from 1.25 to 12.5 μm and wherein at least a portion of the second particles protrude from the second surface of the binder component so as to define a nonuniform and discontinuous surface.

2. The decorative laminate of claim 1 wherein said material comprises natural glass.

3. The decorative laminate of claim 1 wherein said first particles have a Mohs hardness of from 4 to 6.

4. The decorative laminate of claim 1 wherein said aluminosilicate ingredient comprises an alkali aluminosilicate.

5. The decorative laminate of claim 1 wherein said second particles comprise crosslinked poly(methyl methacrylate).

6. The decorative laminate of claim 1 wherein the exterior surface of said substantially cured coating composition has a Sheffield Smoothness in the range of from 100 to 300 cubic centimeters per minute.

7. The decorative laminate of claim 1 wherein the binder comprises at least one resin ingredient selected from the group consisting of a thermoplastic resin ingredient, a thermosetting resin ingredient, and combinations thereof.

8. The decorative laminate of claim 1 wherein the binder is present in an amount in the range of from about 45 percent to about 99.99 percent based on the total weight of the coating composition.

9. The decorative laminate of claim 1 wherein the first particles have a Krumbein roundness of 0.8 or less and a Krumbein sphericity of 0.9 or less.

10. The decorative laminate of claim 1 wherein the first particles have a Krumbein roundness of 0.7 or less and a Krumbein sphericity of 0.7 or less.

11. A decorative laminate comprising:
a) a substrate having a major surface;
b) a decorative layer located on the major surface; and
c) a coating layer located over the decorative layer, wherein the coating layer comprises:
   i) a substantially cured binder component having a first surface adjacent said major surface of the substrate and a second surface that is opposite the first surface; and
   ii) a particle component comprising:
      a plurality of first particles, wherein the first particles are non-spherical and have an average particle size in the range of from 1 to about 12 μm and have a Mohs hardness of from 4 to 7, wherein the first particles are present in an amount in the range of from 0.5 to 8 percent based on the total weight of the coating layer and wherein the first particles are made of material comprising inorganic, amorphous, glass material, wherein said material comprises an aluminosilicate ingredient; and
      a plurality of second particles, wherein the second particles are at least substantially spherical and have an average particle size of from 20 to 30 μm, wherein the second particles are present in an amount in the range of from 0.01 to 15 percent based on the total weight of the coating layer and wherein the second particles are made of material comprising organic material, wherein the cured binder has a thickness in the range of from 1.25 to 12.5 μm and wherein at least a portion of the second particles protrude from the second surface of the binder component so as to define a nonuniform and discontinuous surface.

12. An article adapted for lamination to a substrate, said article comprising:
a) a paper, fabric or plastic sheet having first and second major surfaces, one of said major surfaces bearing a printed pattern, and
b) overlaying said printed pattern, a coating composition that comprises
   1) a substantially cured polymeric binder having a thickness of from 1.25 to 12.5 μm, and
   2) a plurality of particles that comprise, based on the total weight of said coating composition,
      (A) from 0.5 to 8% by weight of non-spherical inorganic, amorphous, glass particles that comprise an alkali aluminosilicate, said glass particles having
         (i) an average particle size of from 1 to 12 μm,
         (ii) a Mohs hardness of from about 5 to about 5.5,
         (iii) a Krumbein roundness of no more than 0.8, and
         (iv) a Krumbein sphericity of no more than 0.7; and
      (B) from 0.01 to 15% by weight of substantially spherical organic particles having an average particle size of 20 or 30 μm, at least a portion of said organic particles protruding from the surface of the coating composition opposite said printed pattern so as to provide a non-uniform, discontinuous surface that has a Sheffield Smoothness of from 100 to 300 cc/min.

* * * * *